(12) United States Patent
Muderlak

(10) Patent No.: US 7,140,050 B2
(45) Date of Patent: Nov. 28, 2006

(54) AUTOMATIC FLUSHING ACTUATOR FOR TANK STYLE TOILET

(75) Inventor: Kenneth J. Muderlak, Milwaukee, WI (US)

(73) Assignee: Technical Concepts, LLC, Mundelein, IL (US)

( * ) Notice: Subject to any disclaimer, the term of this patent is extended or adjusted under 35 U.S.C. 154(b) by 0 days.

(21) Appl. No.: 10/678,865

(22) Filed: Oct. 3, 2003

(65) Prior Publication Data

US 2004/0068784 A1    Apr. 15, 2004

Related U.S. Application Data

(60) Provisional application No. 60/418,087, filed on Oct. 12, 2002.

(51) Int. Cl.
*E03D 5/00* (2006.01)
*E03D 5/10* (2006.01)

(52) U.S. Cl. .................. 4/405; 4/406; 4/313; 4/412; 4/249; 4/413; 4/DIG. 3

(58) Field of Classification Search .............. 4/313, 4/406, DIG. 3, 249, 412–414, 405, 407–411
See application file for complete search history.

(56) References Cited

U.S. PATENT DOCUMENTS

| | | | | |
|---|---|---|---|---|
| 361,203 | A | * | 4/1887 | Bate .............. 4/411 |
| 407,746 | A | | 7/1889 | Stevens |
| 668,990 | A | | 2/1901 | Jenkins |
| 2,061,310 | A | * | 11/1936 | Kleiser, Jr. .......... 4/406 |
| 2,813,274 | A | | 11/1957 | Lewis et al. |
| 3,466,674 | A | * | 9/1969 | Schroder .......... 4/407 |
| 3,559,217 | A | | 2/1971 | Johnson |
| 4,141,091 | A | | 2/1979 | Pulvari |
| 4,185,336 | A | | 1/1980 | Young |
| 4,203,173 | A | * | 5/1980 | Morris et al. .......... 4/427 |
| 4,329,745 | A | | 5/1982 | Aguero |
| 4,338,690 | A | | 7/1982 | Hsieh et al. |
| 4,392,260 | A | | 7/1983 | Benson |
| 4,443,898 | A | | 4/1984 | Aguero |
| 4,756,031 | A | | 7/1988 | Barrett |
| 4,825,490 | A | | 5/1989 | Benshoof |
| 4,831,670 | A | | 5/1989 | Velasquez |
| 4,941,215 | A | | 7/1990 | Liu |
| 5,003,643 | A | | 4/1991 | Chung |
| 5,036,553 | A | | 8/1991 | Sanderson |
| 5,307,524 | A | | 5/1994 | Veal |

(Continued)

FOREIGN PATENT DOCUMENTS

CA    1054306    5/1979

(Continued)

*Primary Examiner*—Khoa D. Huynh
(74) *Attorney, Agent, or Firm*—Brinks Hofer Gilson & Lione

(57) ABSTRACT

An automatic flushing actuator that mounts to an overflow pipe in a tank style toilet includes a proximity sensor, a housing enclosing a motor mount and gear assembly, and a rotatably mounted lever on top of the housing. A clamp is adapted to be affixed to the side of the housing and secure the actuator to the overflow pipe. When installing the actuator, the clamp is affixed to the overflow pipe before the housing is mounted onto the clamp. The clamp allows the housing to be removably mounted or locked in position on the clamp. The lever coupled to the top of the housing is rotated to a desired position, and a chain is connected to a handle of the toilet opens the flush valve.

13 Claims, 13 Drawing Sheets

U.S. PATENT DOCUMENTS

| | | |
|---|---|---|
| 5,353,443 A | 10/1994 | Sim |
| D352,100 S | 11/1994 | Veal |
| D352,101 S | 11/1994 | Veal |
| 5,369,816 A | 12/1994 | Chen |
| 5,410,766 A | 5/1995 | Schumacher |
| 5,603,127 A | 2/1997 | Veal |
| D380,817 S | 7/1997 | Veal |
| D382,948 S | 8/1997 | Veal |
| D393,627 S | 4/1998 | Veal |
| 5,901,384 A | 5/1999 | Sim |
| 6,202,227 B1 | 3/2001 | Gurowitz |
| 6,237,165 B1 * | 5/2001 | Chen et al. .................... 4/406 |
| 6,618,864 B1 * | 9/2003 | Veal .............................. 4/406 |
| 2002/0029412 A1 | 3/2002 | Veal |

FOREIGN PATENT DOCUMENTS

| | | |
|---|---|---|
| GB | 2 260 998 | 5/1993 |
| WO | WO 9313275 | 7/1993 |

* cited by examiner

AUTOMATIC FLUSHING ACTUATOR FOR TANK STYLE TOILET

RELATED APPLICATION

This application claims the benefit of U.S. Provisional Application No. 60/418,087 filed on Oct. 12, 2002, the entire disclosure of which is incorporated by reference.

FIELD OF THE INVENTION

The present invention relates to an automatic flushing actuator, and in particular, to automatic flushing actuators for tank style toilets.

BACKGROUND OF THE INVENTION

Public awareness of personal hygiene and water conservation issues over the last several years has caused manufacturers of sanitary facility and hygiene devices to develop automatic actuators for sanitary facilities such as toilets and urinals. One purpose of such devices is to eliminate human contact with the surfaces that may contain disease spreading bacteria, and to automatically control the amount of flush water used to eliminate waste.

Such a device is disclosed in U.S. Pat. No. 5,680,879, titled "Automatic Flush Valve Actuation Apparatus For Replacing Manual Flush Handles." In particular, the apparatus includes an enclosure containing a drive mechanism, which actuates a plunger pin and a self-contained power source for the drive mechanism. The drive mechanism and power source are connected to a sensor which senses the use of the facility and actuates the drive mechanism to move the plunger pin. The plunger pin pushes the valve stem and the toilet is flushed. The apparatus may be easily installed on a non-tank style toilet by removing the manual flush handle assembly from the toilet valve and securing the apparatus in place of the handle assembly.

Another such device is disclosed in pending U.S. patent application Ser. No. 10/032,442 entitled "Flushing Actuator With Handle." The disclosed flushing actuator also includes an enclosure containing a drive mechanism and a self-contained power source. The drive mechanism is connected to a sensor, which senses the use of the facility and actuates the drive mechanism, which in turn, pushes down on the handle to flush a toilet. One advantage of this flushing actuator is that it may be installed directly to an existing toilet valve without removing the handle or any other components of the toilet valve.

Both of these automatic flushing actuators are compact, easily installed, and work well on non-tank style toilets. However, neither of these automatic flushing actuators can be used with a tank style toilet. Accordingly, there is a need for an automatic flushing actuator for tank style toilets.

Automatic flushing actuators for tank style toilets are disclosed in U.S. Pat. No. 5,603,127 entitled "Auto Flush For Tank Toilet" and U.S. Pat. No. 6,618,864 entitled "Automatic Flushing And Seat Raising Arrangements For Toilets," both of which are incorporated herein by reference. While these automatic flushing actuators are suitable for their intended use, there remains a need for an automatic flushing apparatus for tank style toilets which is compact, easily installed, adaptable to fit all models of tank style toilets, and vandal proof.

BRIEF SUMMARY OF THE INVENTION

The present invention is directed to an automatic flushing actuator for use in a tank a of a tank style toilet. In one aspect, the actuator includes a housing comprising a base and a cover with the cover having a rotatable lever mounted thereon.

In another aspect, the actuator housing is secured to a component inside a toilet tank by a clamp which is removably mounted to the housing.

In yet another aspect, the clamp may be changed from a removably mounted configuration to a permanently mounted position by rotating a clamp about 180 degrees.

Other systems, methods, features, and advantages of the invention will become apparent to one skilled in the art upon examination of the following figures and detailed description, within the scope of the invention, and protected by the accompanying claims.

DETAILED DESCRIPTION OF THE INVENTION

Figure 1:
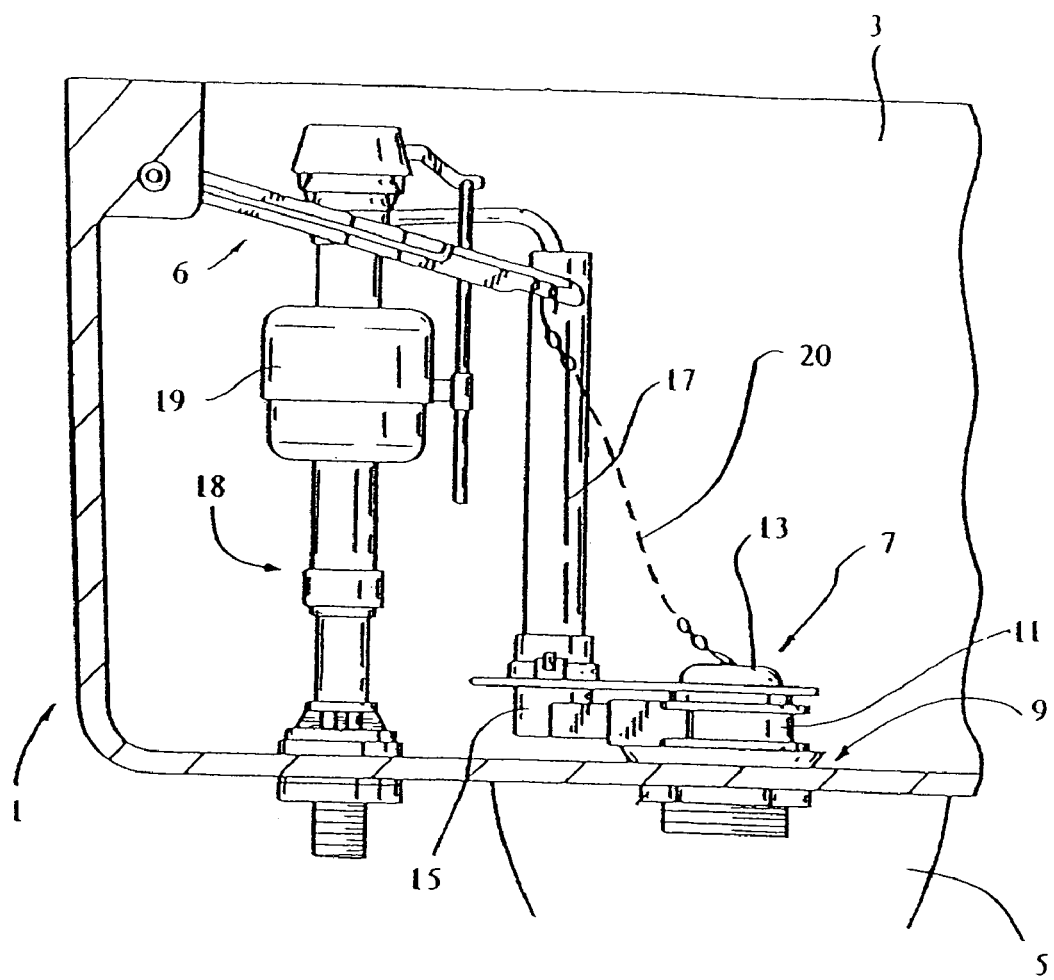
FIG. 1 is a side elevational view of the interior of a prior art tank style toilet.

Referring now to FIG. 1, a prior art tank style toilet includes a tank 3, and a toilet bowl 5 which is initially filled through a fill valve 6. A flush valve 7 is mounted in the bottom of the tank that releases the water in the toilet tank 3 to flush the toilet bowl 5. In addition, a siphon (not shown) is molded into the bowl. The bowl siphon comprises a siphon tube which regulates the water level in the bowl. As water enters the bowl 5, the extra water spills over the edge of the siphon tube and drains away. If water enters the bowl at a rate which causes the siphon tube to fill, the siphon "siphons" the fluid out of the bowl into the sewer pipe. The bowl 5 is emptied, air enters the siphon tube and the siphoning process stops. The toilet tank 3 operates to supply a volume of water to the bowl 5 at a sufficient rate to activate the siphon.

The flush valve 7 is mounted in an opening 9 and controls water flow between the tank 3 and bowl 5. As shown in FIG. 1, the flush valve 7 includes a valve seat 11, a flap lid 13, a pivotable valve mount 15, and an overflow tube 17. The tank style toilet further includes a fill valve 6 which is mounted within the tank and includes a float and bowl fill tube assembly 18. In operation, the fill valve 6 receives water from outside the toilet and fills the tank 3 to a level controlled by the float 19. As water is received within the tank 3 through the fill valve 6, a portion of the water is introduced through the bowl fill tube 18 into the overflow tube 17 to partially fill the bowl 5. The purpose of diverting water to the bowl is to fill a "P" trap and prevent sewer gases from escaping through the bowl.

The toilet 1 can be flushed by operation of an exterior button or handle which is generally connected to the flap lid 13 by a chain 20. When the handle is pushed down, an upward force is exerted on the chain 20 causing the chain to lift the flap lid 13 from the valve seat 11 and empty the water within the tank 3 into the bowl 5. After completion of the flush cycle, the flap lid 13 reseals the valve seat 11 to permit filling of the tank 3 by the valve 6.

Figure 2:
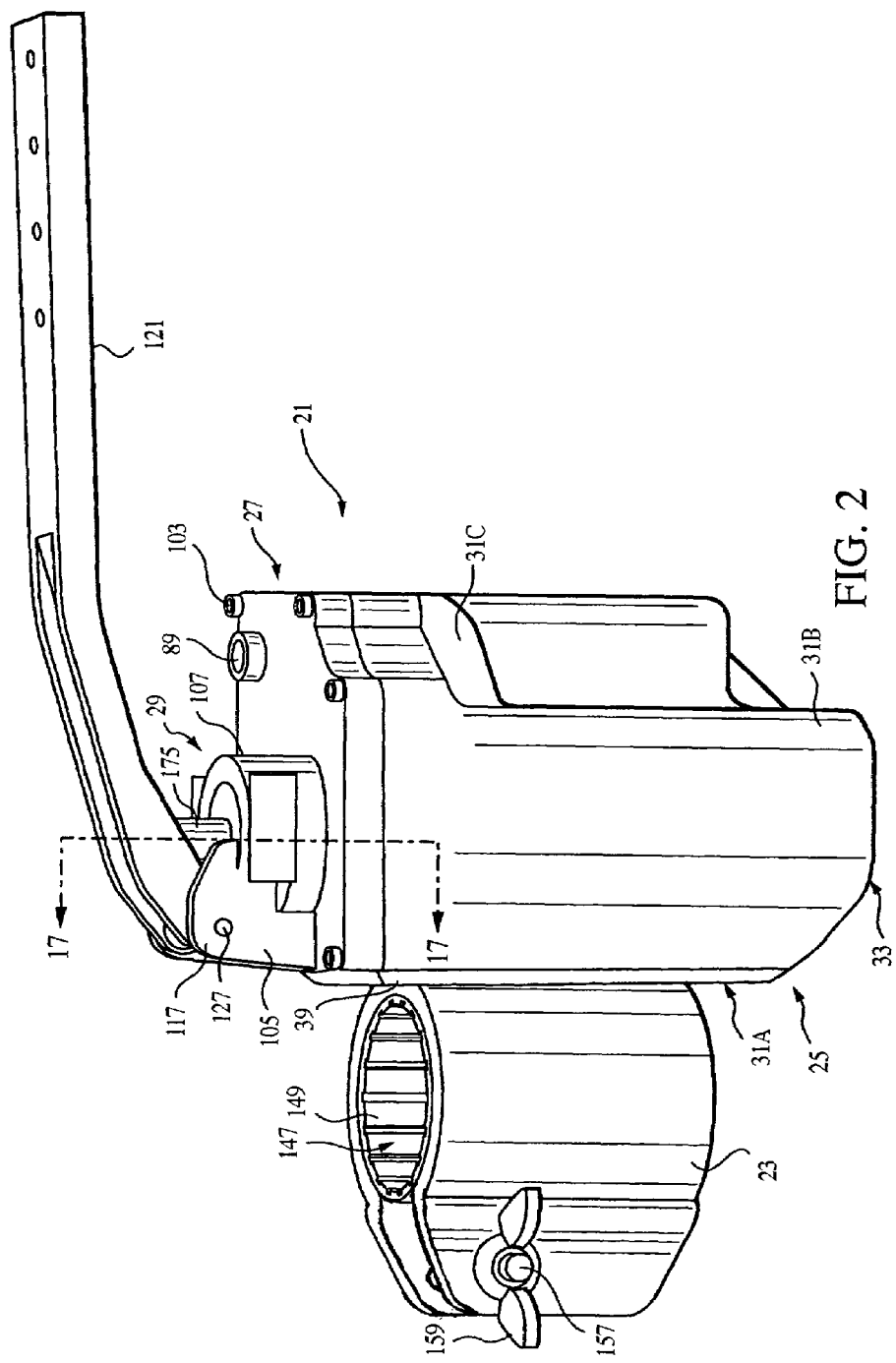
FIG. 2 is perspective view of the housing and clamp of an automatic flushing actuator.
Figure 3:
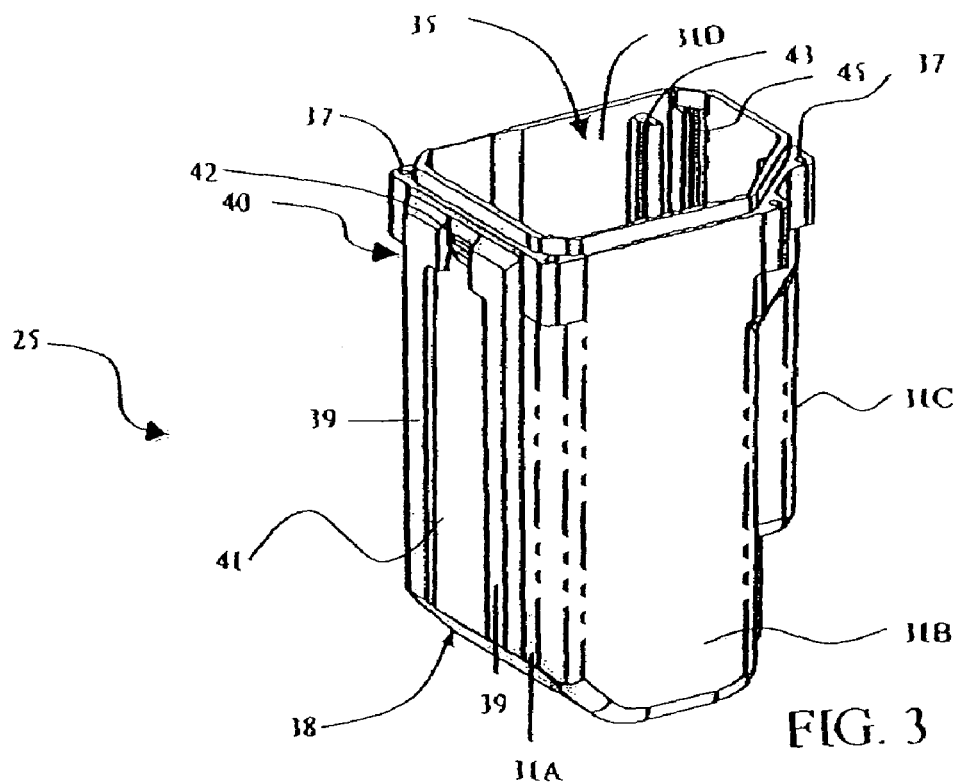
FIG. 3 is a perspective view of a base of the housing shown in FIG. 2.
Figure 4:
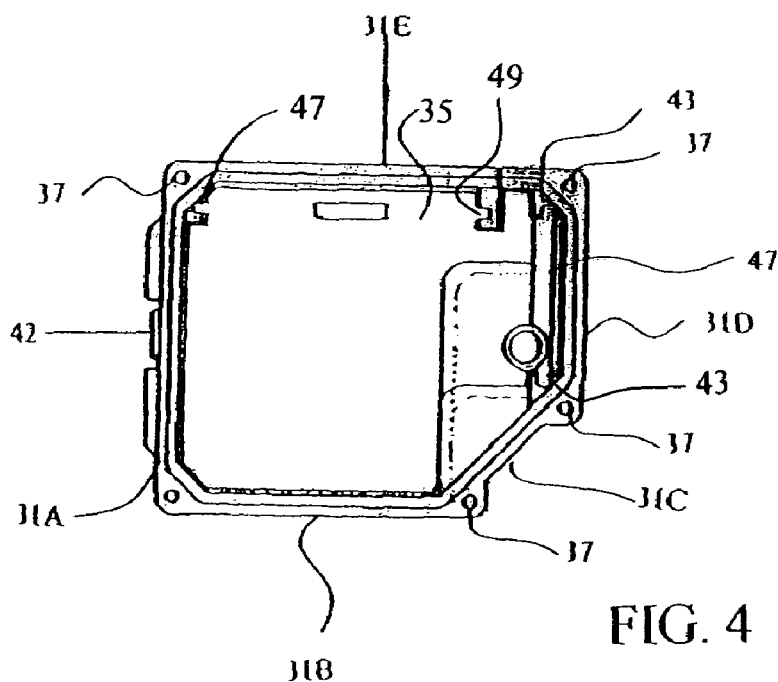
FIG. 4 is a top view of the base of the housing shown in FIG. 2.

Referring now to FIGS. 2–4, the automatic flushing actuator for tank style toilets 1 (FIG. 1) of the present embodiment may include a housing 21 and a mounting clamp 23, which are adapted to be placed inside a tank of a toilet and secured to the overflow pipe 17 (FIG. 1). The housing 21 comprises a lower portion or base 25 and an upper portion or cover 27 having a dual part lever assembly 29 mounted thereon. The housing may be formed from many waterproof materials that are capable of forming a watertight seal, and will not quickly degrade as a result of being submerged in water. Such materials may include, but are not limited to, plastic, rubber, and stainless steel.

The base 25 is formed by sidewalls 31A–E and a bottom wall 33 and includes an internal chamber 35 for housing a motor mount and gear assembly and a circuit board. The sidewalls 31A–E and the bottom wall 33 may be integrally or separately formed to create the base 25. A plurality of apertures 37 are placed at upper corners of the base 25. These apertures are shaped and configured to receive screws to securely affix the base 25 to the cover 27 (FIG. 2). A set of clamp guide rails 39 are affixed to or integrally molded as part of the exterior of the sidewall 31A of the base. The guide rails 39 form a clamp channel 41 for slidably receiving a mounting plate affixed to the clamp 23. The channel has an open end 38 and a closed end 40. A ridge 42 is formed on the base in the middle of the closed end 40 of the channel and allows the clamp to be locked onto the housing. The internal chamber 35 also includes two sets of guide rails 43 and 45 on the interior of walls 31D and 31E, which form interior channels 47 and 49 for slidably receiving the motor mount assembly and the electrical circuit board to secure each in place in the chamber 35.

Figure 5:
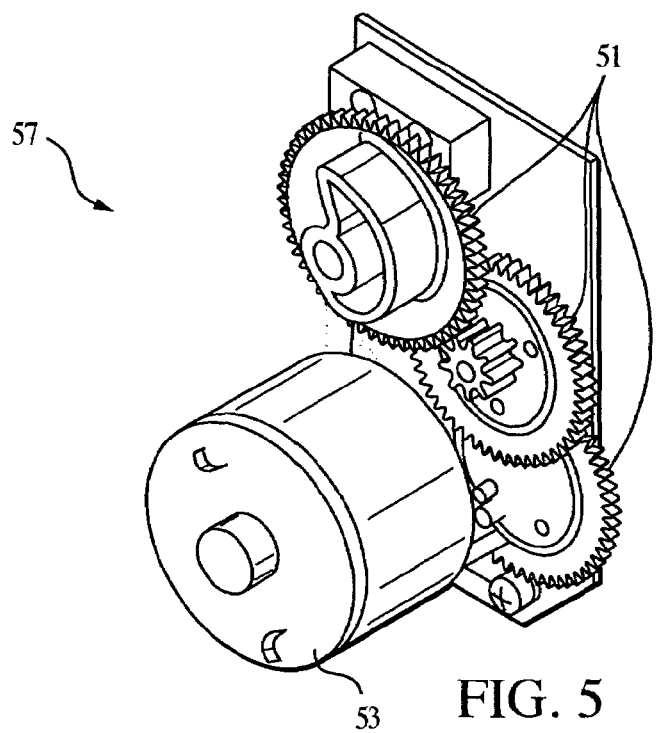
FIG. 5 is a perspective view of a motor and gear mount assembly.
Figure 6:
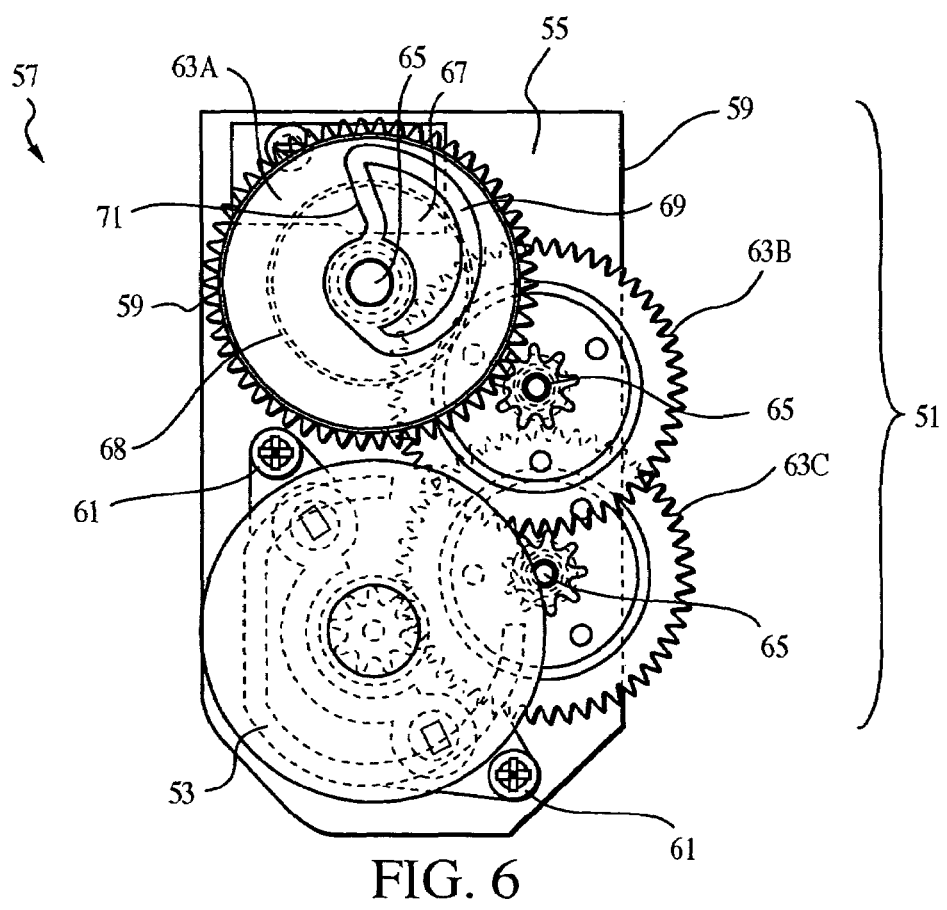
FIG. 6 is a top view of the motor and reduction gear mechanism shown in FIG. 5.
Figure 7:
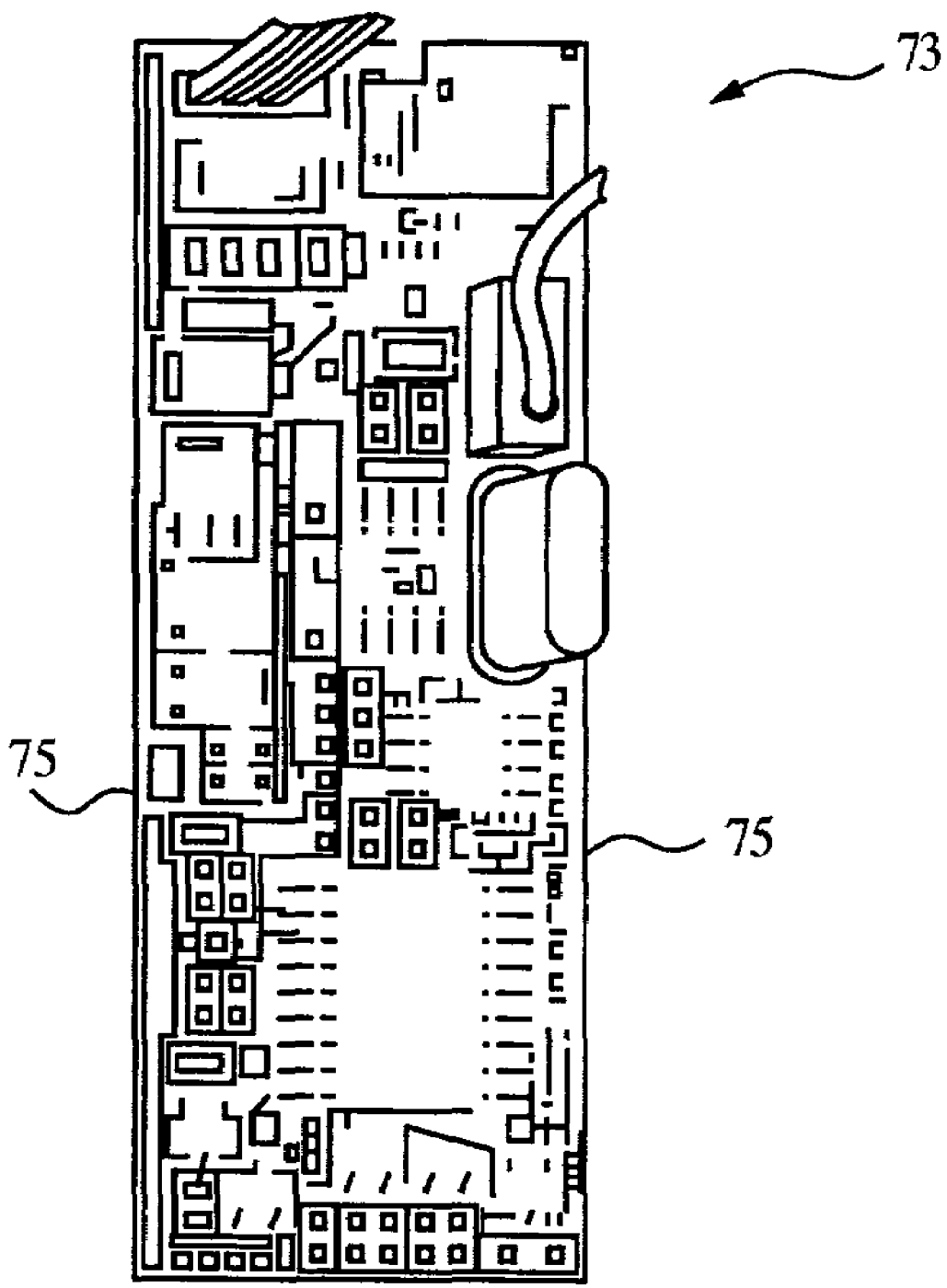
FIG. 7 is top view of an electrical circuit board used in the automatic flushing actuator.

As shown in FIGS. 5–6, a reduction gear mechanism 51 and a motor 53 for driving the mechanism are affixed to a motor mount plate 55 to form a motor mount and gear assembly 57. The motor mount plate 55 has longitudinal edges 59 adapted to be slidably received in guide rails 43. The motor 53 is rigidly affixed to the plate 55 by screws 61 while gears 63A–C forming the reduction mechanism are rotatably mounted on shafts 65, which are rigidly secure to the motor mount plate 55. A cam 67 or drive element is securely affixed to an upper surface 68 of the gear 63A of the gear reduction mechanism. The cam 67 includes a first semi-circular contact surface 69 and a second substantially linear contact surface 71 for contacting and activating an actuator rod discussed below. As shown in FIG. 7, a generally rectangular electrical circuit board 73 (circuit not shown) likewise has longitudinal edges 75 adapted to be slidably received in guide rails 45 (FIGS. 3 and 4) in an internal chamber.

Figure 8:
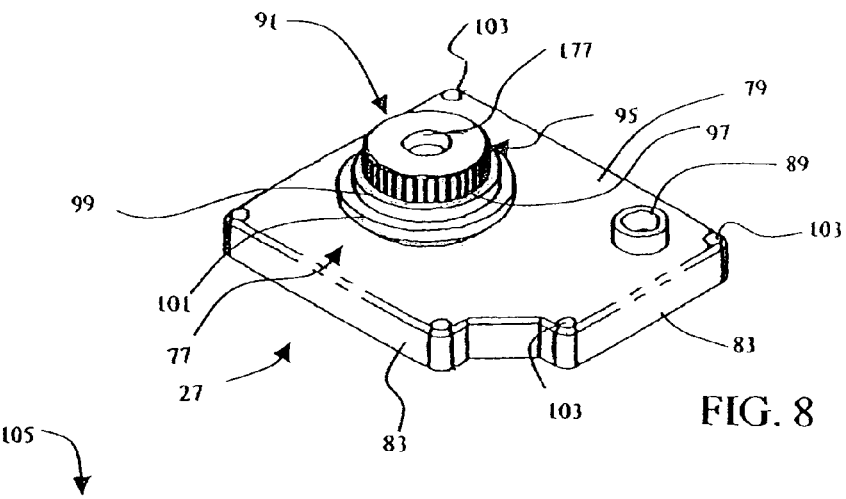
FIG. 8 is a perspective view of the cover of the housing shown in FIG. 2.
Figure 9:
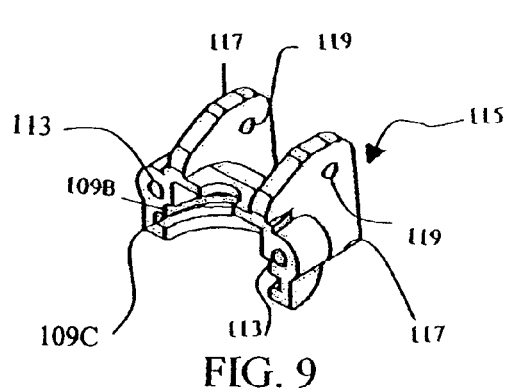
FIG. 9 is a perspective view of a lever clamp.
Figure 10:
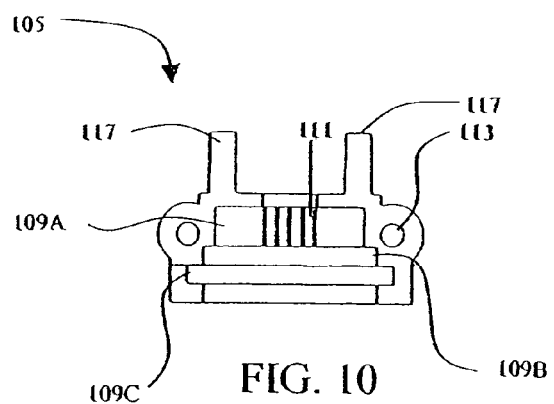
FIG. 10. is a cross-sectional view of the lever clamp shown in FIG. 9 taken along line 10—10.
Figure 11:
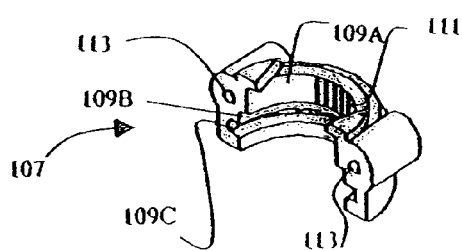
FIG. 11 is a perspective view of a second lever clamp.
Figure 12:
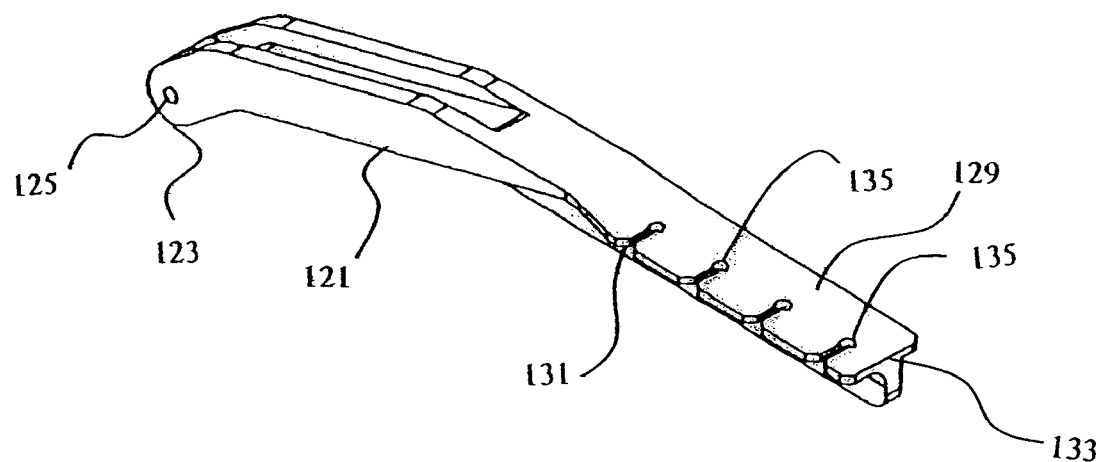
FIG. 12 is a perspective view of a lever used in the automatic flushing actuator.
Figure 13:
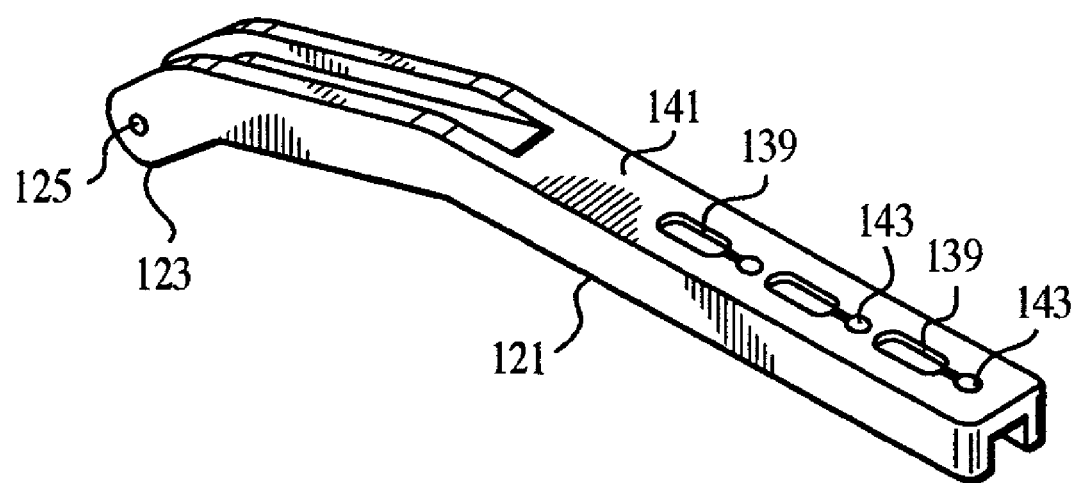
FIG. 13 is a perspective view of another embodiment of a lever used in the automatic flushing actuator of the present invention.

Referring now to FIG. 8, the upper portion or cover 27 of the housing comprises a top 77 having an exterior surface 79 and an interior surface (not shown), and cover sidewalls 83. A groove is formed in the interior surface of the top 79 and is adapted to receive an O-ring (not shown) to form a waterproof seal between the base 25 and the cover 27. A plurality of apertures 103, which correspond to and align with the base apertures 37 (FIGS. 3 and 4) are placed at the corners of the cover 27. In order to secure the cover 27 and base 25 together to form the waterproof housing, the cover 27 is placed on the base 25 and screws are threaded through apertures 103 and base apertures 37 (FIGS. 3 and 4) and then tightened.

An opening 89 extends through top 77 and allows wires for sensor circuitry to pass into the housing. A turret 91 is positioned on the top 77 of the cover 27 and has a turret shaft (not shown) extending through the cover into the internal chamber 35 of the base when the base 25 and cover 27 are assembled. An upper portion 95 of the turret is provided with serrations 97 for locking the dual lever assembly in place. The turret 91 further includes a first seating flange 99 below the serrated portion of the turret which has a diameter greater than that portion of the turret. A second seating flange 101 positioned below the first flange has a larger diameter than the first flange.

As shown in FIGS. 2, and 9–13, a dual part lever assembly 29 is secured to the turret 91 (FIG. 8) and is rotatable around about the turret 360 degrees in either a clockwise or counterclockwise direction. The lever assembly includes first and second generally semi-circular lever clamp caps 105 and 107 configured to conform to the turret. Each lever clamp cap includes three interior recesses 109A–C which engage the upper portion 95 (FIG. 8) of the turret and first and second seating flanges 99 (FIG. 8) and 101 (FIG. 8) of the turret. The seating flanges prevent the lever assembly from being pulled off the turret 91. The uppermost recess 109A in the lever clamp cap has serrations 111 which engage the serrations 97 (FIG. 8) of the upper portion 95 (FIG. 8) of the turret and assist in locking the lever assembly in a desired position. Opening 113 at the ends of the lever clamp caps 105 and 107 align when the clamp caps are mounted on the turret. A screw passes through the opening 113 which engage the serrations of the upper portion 95 of the turret and the clamp cap 105 and 107 when tightened. Therefore, when the screw is tightened, the position of the level can be established by a ratcheting function.

The first lever clamp cap 105 further includes a lever mount 115 including two mount walls 117 having openings 119 there through. A lever 121 having a first end 123 with a bore 125 there through is pivotally attached to the lever mount by a pin 127 (FIG. 2) extending through the openings 119 in the mount walls 117 and the bore 125. A second end 129 of the lever includes at least one slot 131 or a plurality of slots for receiving and securing the chain attached to the flush valve 13 (FIG. 1) to the lever 121. In one embodiment shown in FIG. 12, the lever is T-shaped and the slot 131 extends partially across a width 133 of the lever and includes a generally circular recess 135 at one end of the slot. In another embodiment shown in FIG. 13, the lever 121 may be generally U-shaped and have a slot 139 or a plurality of slots extending longitudinally along a top surface 141 of the lever 121. The slots 139, configured to receive the chain attached to the flush valve in the toilet tank, are generally elliptically shaped and have a circular portion 143 extending from one end of the slot.

As shown in FIGS. 2, 3, and 14–15, the mounting clamp 23 is generally cylindrical in shape and has an inner diameter 145 which is larger than a standard overflow pipe in a tank style toilet. The clamp 23 may optionally include a shim 147, which assists in securely affixing the clamp to an overflow pipe with a smaller outer diameter. The insert 147 may further include engagement ribs 149 on an interior surface 151 for additional frictional engagement with the overflow pipe. The clamp insert may be plastic, rubber, or any other suitable material.

The clamp 23 further has securing tabs 1 53A–B extending from the cylindrical portion of the clamp. Each securing tab 153 has an opening 155 for receiving a screw 157 (FIG. 2) having a standard round head which is generally larger than openings 155. The screw 157 (FIG. 2) bridges the tabs 153A–B and is held in place by a nut 159 (FIG. 2) which is tightened by rotating the nut 159 (FIG. 2) around the screw 157 (FIG. 2). In one embodiment the nut is a wing nut; however, other types of nuts, such as hexagonal nuts may also be used.

In another embodiment, the screw threaded through the securing tabs 153A–B has a hexagonal head which can only be loosened or tightened using an L-shaped Allen wrench. Additionally, outside walls 161 of the securing tabs 153A–B have a screw pocket 163 and a nut pocket (not shown). The screw pocket is generally oval shaped while the nut pocket (not shown) takes the form of the nut that is being used. In one embodiment, the nut and nut pocket are hexagonal in shape. This arrangement has several advantages. First, when the clamp 23 is being mounted on overflow pipe or another component in the toilet tank, the nut is placed in the nut pocket and held there so that the screw can be tightened using one hand. Second, the use of the hexagonally shaped screw head is particularly effective in preventing theft of the automatic flushing actuator because the screw can only be loosened by an Allen-type wrench and not a standard flat or Phillips head screwdriver.

Figure 14:
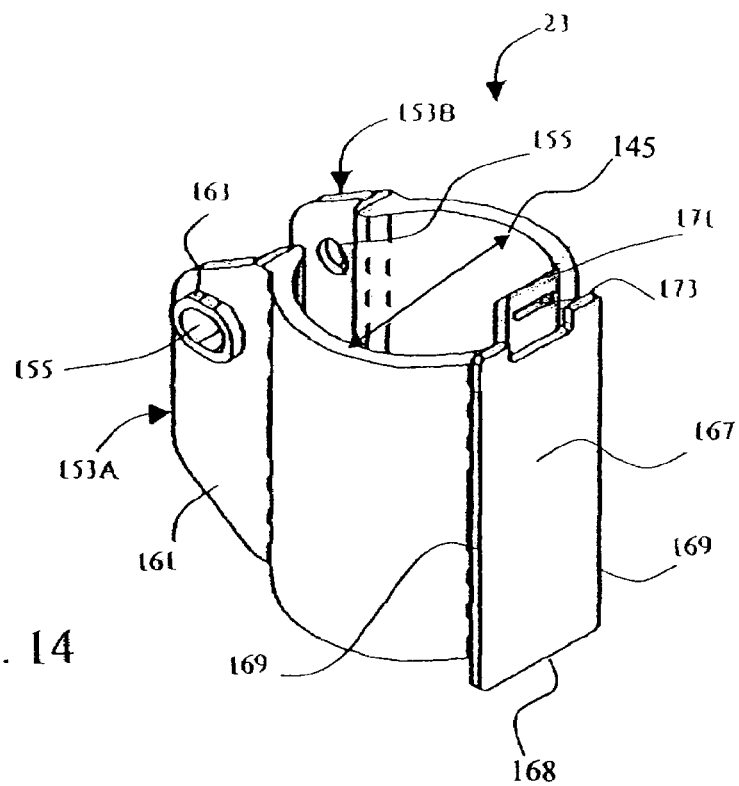
FIG. 14 is a perspective view of the clamp shown in FIG. 2 which is used to mount the flushing actuator in a toilet tank.
Figure 15:
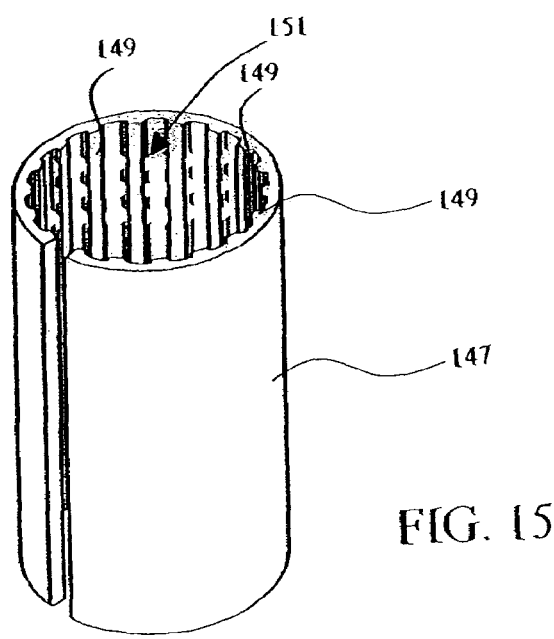
FIG. 15 is perspective view of an insert for the clamp shown in FIG. 14.

The clamp 23 further has a mounting plate 167 opposite the securing tabs 153A–B for affixing the clamp to the base 25 (FIG. 2) of the housing 21 (FIG. 2). As shown in FIG. 14, the mounting plate 167 is generally rectangular in shape and has longitudinal edges 169. A tab 171 extends from one end of the mounting plate 167 and includes an opening 173 extending partially through the tab for locking the clamp to the base 25.

The clamp may be securely locked or removably affixed to the base 25 (FIG. 2) by inserting one end of the mounting plate 167 into the guide rails 39 on sidewall 31A and sliding the clamp through the channel 41 (FIG. 3) until the mounting plate 167 reaches the closed end of 40 (FIG. 3) the channel. If the clamp is secured to the base by inserting the rectangular end 168 of the mounting plate 167 into the channel 41, the clamp may be easily removed from the housing. Alternatively, if the clamp is rotated 180 degrees so that the opposite end of the mounting plate 167 with the tab 171 is inserted into the channel first, the opening 173 in the tab 171 will engage the ridge 42 on the base and lock the clamp to the housing. This locking action assists in preventing theft of the flushing actuator from public restroom facilities.

Referring now to FIGS. 2, 8, and 16–17 an actuator rod 175 extends through turret shaft 93 and through an opening 177 in the upper portion 95 of the turret and is reciprocally movable in relation to the opening. An O-ring (not shown) is positioned inside the upper portion 95 of the turret in order to provide a water tight seal and prevent water in the flush tank 3 (FIG. 1) from leaking into the housing 21. A first end 174 of the actuator rod 175 is securely attached to a cam contact hub 181 which includes a radially extending flange 183 and guides the hub and actuator rod during axial movement of the rod in the turret shaft. A compression spring 185 is positioned on the actuator rod 175. One end of the compression spring 185 engages the radially extending flange 183, and the second end 178 of the spring 185 engages a face plate 176 which is mounted on the actuator rod 175 at an end opposite the cam contact hub 181. The spring allows the actuator rod to return to its original pre-flush position after the automatic actuator has been activated and the toilet is flushed.

Figure 18:
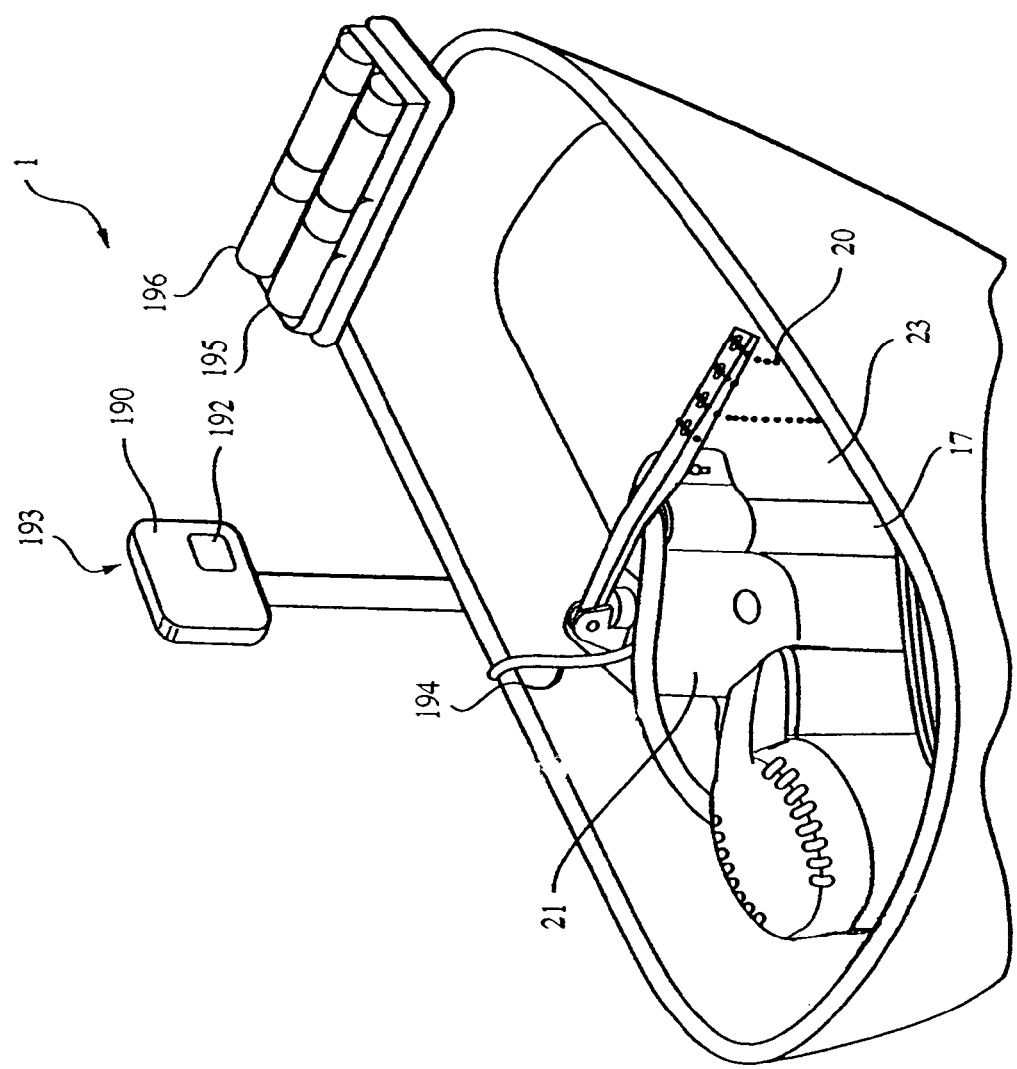
FIG. 18 is perspective view of the automatic flushing actuator of the present invention installed in a toilet tank.

Referring now to FIG. 18, the automatic flushing actuator is shown installed in a tank style toilet 1. When installing the actuator, the clamp 23 is placed around the overflow pipe 17 and secured thereto using a screw and nut assembly. Alternatively, the clamp may be affixed to another component in the tank or to a rod or pipe in the tank which has been installed in the tank to hold the actuator housing 21. The housing 21 is then either removably mounted or securely locked onto the clamp 23 also. The lever 121 is then rotated to the desired position and the flush valve chain 20 is secured to the lever 121.

The housing 21 and clamp 23 assembly of the automatic flushing apparatus of the present invention provides several advantages. First, installation of the automatic flushing actuator is easier because it can be installed in two separate pieces. The clamp 23, a relatively small piece, can be quickly and easily positioned on the overflow pipe 17 or on another component in the tank 3 (FIG. 1) to allow for placement of the housing 21 on the actuator. As a result, the housing 21 does not have to be manipulated around other components in the tank while trying to install the clamp 23 on the overflow pipe 17. Second, the rotatably mounted lever 121 allows the lever to be positioned in the tank to avoid other components in the tank. Third, the rotatable lever 121 allows the automatic flushing actuator to be adapted to be used with all makes and models of tank style toilets regardless of the configuration of the flush valve assembly.

Figure 19:
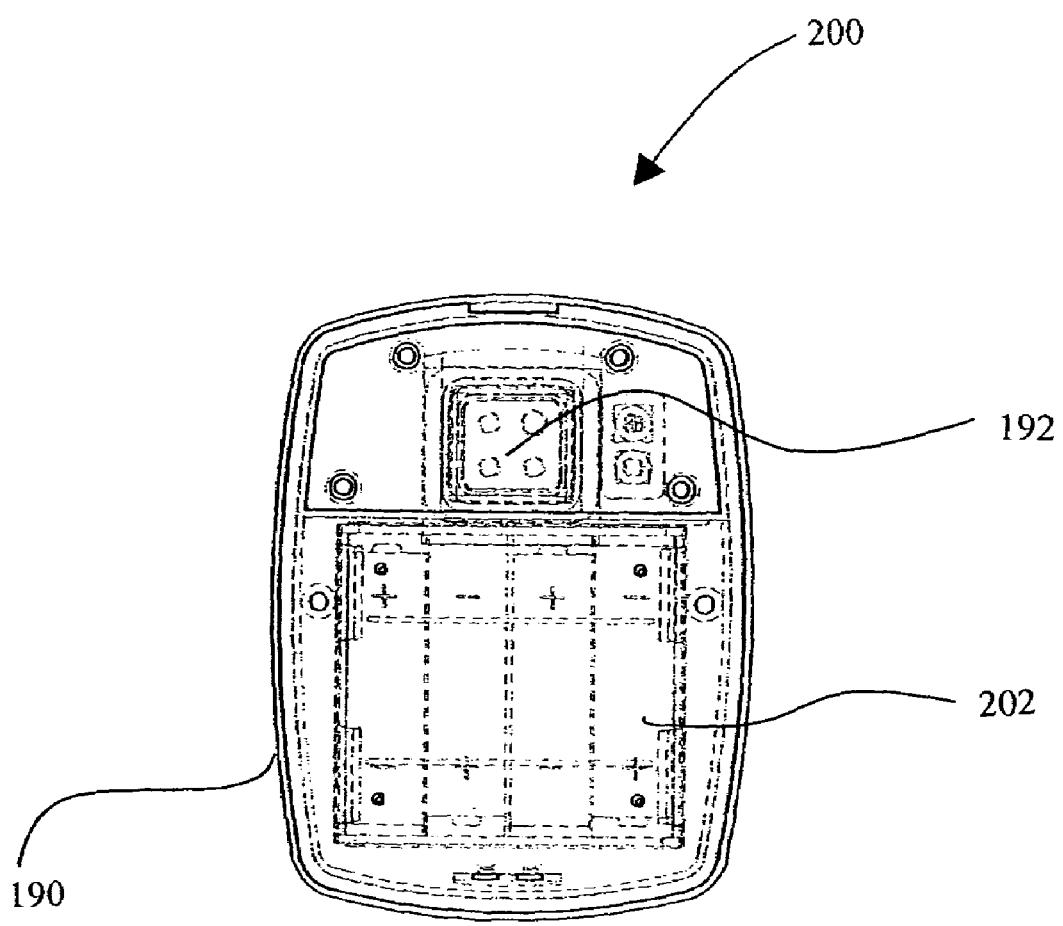
FIG. 19 is front elevational view of a wireless sensor used with the automatic flushing actuator.

Finally, a sensor assembly is activated to complete the installation of the automatic flushing actuator. The sensor 193 may be a motion detector, infra-red sensor, a body heat detector, or any other device that detects or measures something by converting non-electrical energy into electrical or optical energy. Such sensors are well-known in the art and, therefore, are not described in detail herein. In general, the sensor includes a housing 190 and a glass lens assembly 192. The sensitivity range of the sensor 193 may be adjustable so that the sensor can be positioned at any desired location, including but not limited to, mounted on, or in a wall or positioned on top of the toilet tank lid. In FIG. 18, the sensor 193 is mounted on a wall 188 connected to a self-contained power source 195, which includes batteries 196, and by a wire 194 to the electrical circuit board disposed in housing 21 through the opening 89 in the cover 27. In an alternative embodiment, the sensor 193 is connected to the electrical circuit board in the same manner but is plugged into an electrical socket in wall 188. It is further contemplated that the sensor may be a wireless device 200 as shown in FIG. 19 with a self contained power source 202. Such a sensor is not physically connected to the electrical circuit board in the housing, but is in communication with the electrical circuit board by wireless techniques well-known in the art.

Figure 16:
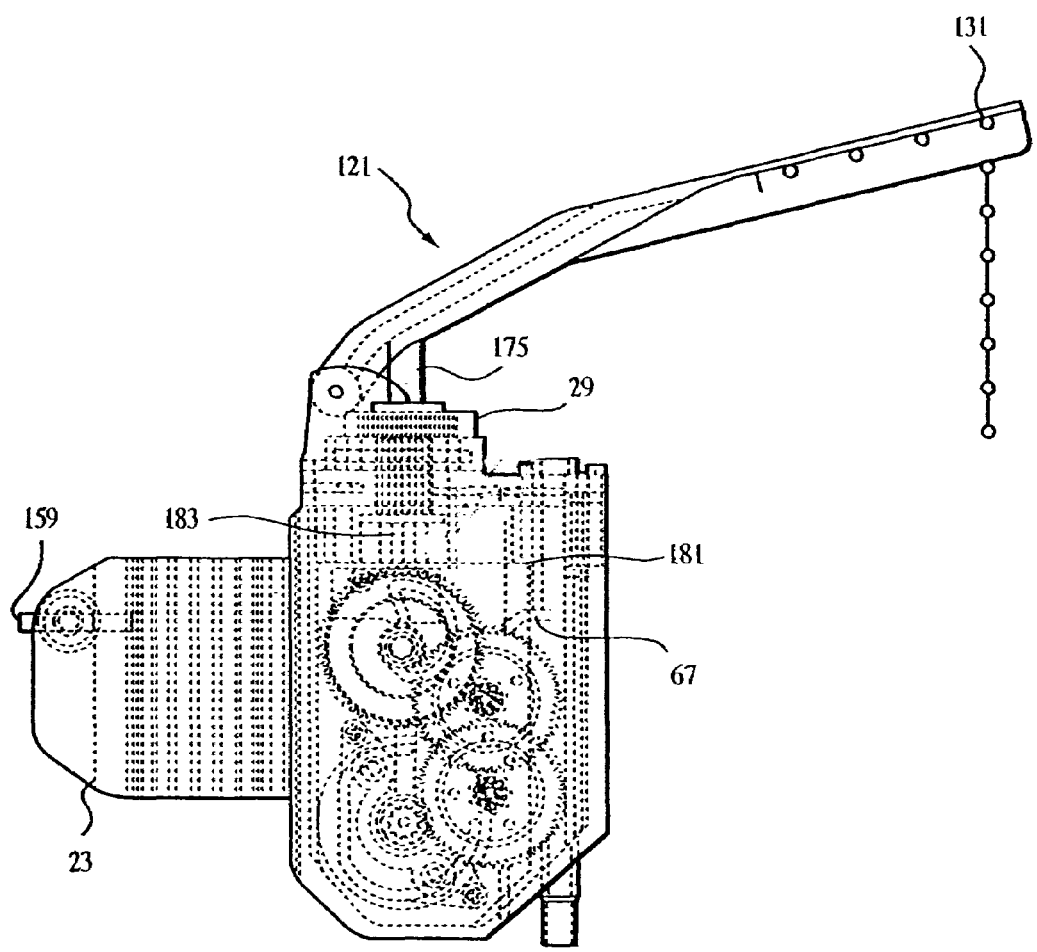
FIG. 16 is a side elevational view of the housing and clamp showing in phantom the motor, reduction gear mechanism, and an actuator rod in an activated position for flushing a toilet.
Figure 17:
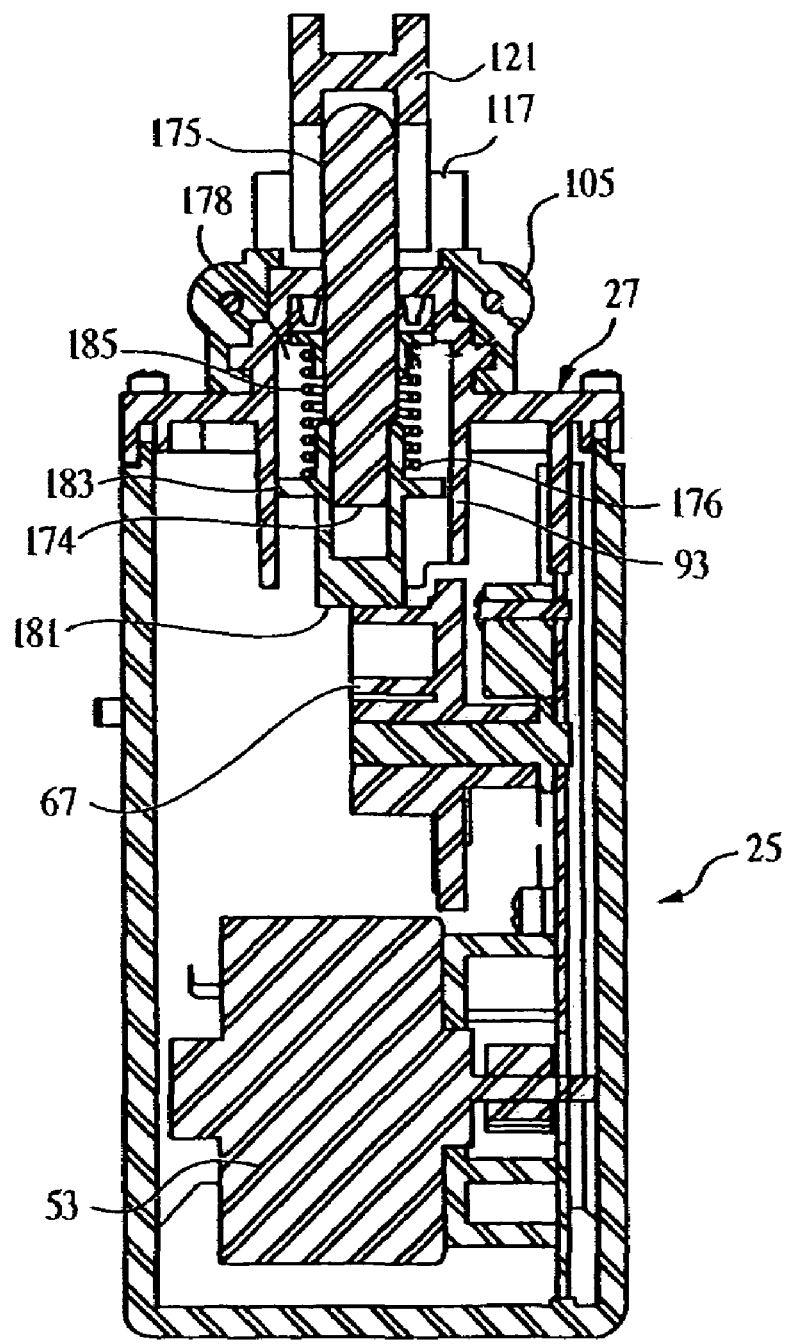
FIG. 17 is a cross-sectional view of the actuator housing taken along line 17—17 of FIG. 2

In operation, the sensor 193 detects the presence of a user or a specified condition (a light turning on or an elapsed time period) and sends an activation signal to the sensing logic or electronics mounted on the electrical circuit board 73 (FIG. 7) in the housing 21. In one embodiment, an activation signal is generated when a user departs from a field of view. Activation of the motor 53 (FIG. 5) occurs when the sensor 193 transmits a signal to a receiver in the circuit board 73 (FIG. 7). The motor 53 (FIG. 5) in turn activates the gear reduction mechanism 51 (FIG. 5) that causes the gears and cam to rotate. The gear having the cam mounted thereon rotates through one complete revolution for each flush cycle. As a result of activation, the cam 67 moves from a quiescent position, to a flushing position, and then back to a quiescent position. As the cam moves from its quiescent state to its flushing state, the cam pushes the actuator rod in an upward direction. The actuator rod then pushes on the lever 121 causing lever to rise in an upward direction as shown in FIG. 16. As the lever 121 is raised, the chain 20 attached to the lever 121 at one end is placed under tension causing the valve flap lid (not shown) to be lifted off of the flush valve, thereby flushing the toilet.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except as necessitated by the accompanying claims and their equivalents.

I claim:

1. An automatic flushing actuator system for a toilet having a tank and a bowl comprising:
    a sensor that detects the presence of an occurrence;
    a receiver coupled to said sensor, said receiver being disposed in a housing having a base and a cover, said cover having a horizontally rotatable lever mounted thereon;
    a gear mechanism connected to said receiver, said gear mechanism having a cam that engages an actuator rod which is in contact with said lever, wherein said lever is rotatable about a longitudinal axis of said actuator rod relative to said housing; and
    a clamp adapted for mounting said housing on a component in the toilet tank.

2. The automatic flushing actuator of claim 1, wherein said clamp is removably mounted to said housing.

3. The automatic flushing actuator of claim 1, wherein said clamp is permanently mounted to said housing.

4. The automatic flushing actuator of claim 1, wherein said clamp is changed from a removable configuration on said housing to a locked configuration by rotating the clamp about 180 degrees.

5. The automatic flushing actuator of claim 1 further comprising an insert configured for placement inside said clamp.

6. The automatic flushing actuator of claim 1, wherein said component comprises an overflow pipe and said clamp is adapted for being affixed to said overflow pipe.

7. The automatic flushing actuator of claim 6, wherein said housing is adapted for being affixed to said clamp after said clamp is affixed to said overflow pipe.

8. The automatic flushing actuator of claim 1 further comprising a turret coupled to an upper portion of said cover.

9. The automatic flushing actuator of claim 8 further comprising a lever assembly coupling said horizontally rotatable lever to said turret.

10. The automatic flushing actuator of claim 9 further comprising serrations on said turret.

11. The automatic flushing actuator of claim 10 further comprising serrations on said inner surface of said lever assembly, wherein said turret serrations engage said lever assembly serrations when said horizontally rotatable lever is rotated thereby establishing said lever assembly in a desired position.

12. The automatic flushing actuator of claim 1 wherein said receiver is wirelessly coupled to said sensor.

13. The actuator of claim 1 further comprising guide rails coupled to said clamp of said housing.

* * * * *